No. 780,333. PATENTED JAN. 17, 1905.
A. FRATANTUONO.
NUT AND BOLT LOCK.
APPLICATION FILED NOV. 10, 1904.

Witnesses
C. C. Hunt.
C. H. Griesbauer.

Inventor
Antonio Fratantuono
by A. B. Wilson
Attorney

No. 780,333.

Patented January 17, 1905.

UNITED STATES PATENT OFFICE.

ANTONIO FRATANTUONO, OF WASHINGTON, DISTRICT OF COLUMBIA, ASSIGNOR OF ONE-HALF TO WILLIAM C. TAYLOR, OF WASHINGTON, DISTRICT OF COLUMBIA.

NUT AND BOLT LOCK.

SPECIFICATION forming part of Letters Patent No. 780,333, dated January 17, 1905.

Application filed November 10, 1904. Serial No. 232,176.

*To all whom it may concern:*

Be it known that I, ANTONIO FRATANTUONO, a citizen of the United States, residing at Washington, in the District of Columbia, have invented certain new and useful Improvements in Nut and Bolt Locks; and I do declare the following to be a full, clear, and exact description of the invention, such as will enable others skilled in the art to which it appertains to make and use the same.

This invention relates to improvements in nut and bolt locks.

The object of the invention is to provide a locking device for nuts whereby the same may be secured in adjusted positions upon a bolt.

A further object is to provide a device of this character which will be simple in construction, strong and durable, efficient, and which will securely hold the nut against rotation upon the bolt.

With these and other objects in view the invention consists of certain novel features of construction, combination, and arrangement of parts, as will be hereinafter described and claimed.

Figure 1:
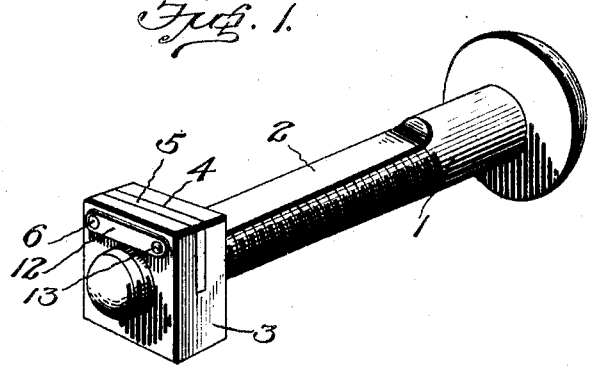
Figure 2:
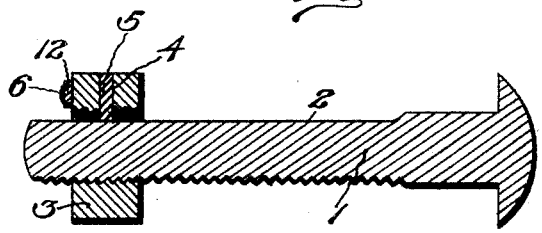
Figure 3:
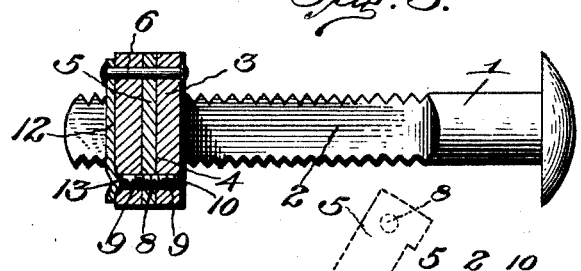
Figure 4:
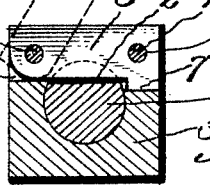

In the accompanying drawings, Figure 1 is a perspective view of a bolt and nut having my improved locking device applied thereto. Fig. 2 is a longitudinal sectional view thereof. Fig. 3 is a detail sectional view through the nut, taken on a line with the pivot and holding-screw of the locking dog or pawl; and Fig. 4 is a transverse sectional view through the nut and the end of the bolt, taken on a line with the locking dog and plate, showing the same in full lines in engagement with the bolt and in dotted lines in a disengaged position to permit the nut to be unscrewed from the bolt.

Referring more particularly to the drawings, 1 denotes a bolt one side of which is cut away to form a flat face 2.

3 denotes a nut in one of the side edges of which is formed a slot or recess 4, which intersects the threaded bolt-hole of the nut.

In the slot 4 is arranged a locking plate or dog 5, which is pivotally connected to the nut at one corner of the same by means of a pivot pin or rivet 6. The opposite end of the locking plate or dog 5 has formed thereon a lateral projection 7, which is adapted to engage the inner wall of the slot 4 when said locking plate or dog is in closed position. In this end of the dog 5 is formed an aperture or hole 8, which when the dog is in closed position is adapted to aline with openings or apertures 9 formed in the adjacent corner of the nut. The holes 9 in the nut are provided with threads, and into the same and through the aperture 8 in the locking-dog is adapted to be screwed a holding-screw 10, which when screwed through said apertures will hold the plate or dog 5 in position against the flat side of the bolt, and will thereby prevent the unscrewing of the nut from the bolt.

Pivotally connected to the upper end of the pivot-pin 6 is a spring latch finger or plate 12, on the opposite end of which is formed an inwardly-projecting teat 13, which when the latch-plate is swung inwardly will spring into the end of the screw-hole 9 in the nut and will engage the countersunk head of the screw 10, thereby preventing said screw from working out of the holes 8 and 9.

In using the device the nut is screwed upon the bolt to any desired position, after which the locking dog or plate is swung inwardly into engagement with the flat side of the bolt, thus bringing the screw-holes 8 and 9 in said nut and locking-pawl into alinement. The screw 10 is now screwed into said openings, thereby holding said locking dog and plate into engagement with the flat side of said bolt, after which the spring-latch 12 is sprung into position, thus preventing said screw from working out of place.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a nut and bolt lock, the combination with a bolt having a flat side, of a nut having formed therein a transversely-disposed slot or recess intersecting the bolt-hole of the nut, a locking dog or pawl pivotally mounted in said slot to engage the flat side of said bolt, and means whereby said locking-dog is secured in engagement with said bolt, substantially as described.

2. In a nut and bolt lock, the combination with a bolt having a flat side, of a nut having formed therein a slot or recess intersecting the bolt-hole of the nut, a locking dog or pawl pivotally mounted in said slot to engage the flat side of said bolt, a holding-screw, screwed through alined apertures in said nut and said pawl or dog, and means whereby said holding-screw is prevented from working out of said apertures, substantially as described.

3. In a nut and bolt lock, the combination with a bolt having a flat side, of a nut having formed therein a slot or recess intersecting the bolt-hole of the nut, a locking dog or pawl pivotally mounted in said slot to engage the flat side of said bolt, a holding-screw, screwed through alined apertures in said nut and said pawl or dog, and a spring latch-finger pivotally mounted on said nut to engage the head of said holding-screw, thereby preventing the same from working out of said apertures, substantially as described.

4. In a nut and bolt lock, the combination with a bolt having a flat side, of a nut having formed therein a slot or recess intersecting the bolt-hole of the nut, a locking dog or pawl pivotally mounted in said slot to engage the flat side of said bolt, a holding-screw, screwed through alined apertures in said nut and said pawl or dog, a spring latch-finger pivotally mounted on the pivot-pin of said locking-dog, a teat formed on the under side of said latch-finger to enter the screw hole or aperture in said nut and to engage the countersunk head of said holding-screw, thereby preventing said screw from working out of said hole and also holding said latch-finger in place, substantially as described.

In testimony whereof I have hereunto set my hand in presence of two subscribing witnesses.

ANTONIO FRATANTUONO.

Witnesses:
  BENJ. G. COWL,
  WM. C. TAYLOR.